United States Patent [19]

Berger et al.

[11] 4,314,867
[45] Feb. 9, 1982

[54] METHOD FOR THE MANUFACTURE OF MOLDED BODIES

[75] Inventors: Fritz Berger, Ottobeuren; Udo Lauterbach, Augsburg; Hermann Wetzel, Memmingen, all of Fed. Rep. of Germany

[73] Assignee: Metzeler Schaum GmbH, Memmingen, Fed. Rep. of Germany

[21] Appl. No.: 84,516

[22] Filed: Oct. 12, 1979

[30] Foreign Application Priority Data

Oct. 13, 1978 [DE] Fed. Rep. of Germany ....... 2844757
Jul. 24, 1979 [DE] Fed. Rep. of Germany ....... 2929992

[51] Int. Cl.³ .............................................. B29B 3/00
[52] U.S. Cl. .................................... 156/196; 156/242; 156/245; 156/322
[58] Field of Search ............... 156/224, 242, 245, 320, 156/322, 196, 212, 220, 222; 264/248, 257, 321, DIG. 65, DIG. 77; 428/160, 320, 322

[56] References Cited

U.S. PATENT DOCUMENTS

| | | | |
|---|---|---|---|
| 3,062,698 | 11/1962 | Aykanian | 156/322 |
| 3,674,585 | 7/1972 | Windecker | 156/245 |
| 3,801,693 | 4/1974 | Stallings et al. | 156/245 |
| 3,829,343 | 8/1974 | Remmert | 156/322 |
| 3,873,654 | 3/1975 | Smith | 428/322 |
| 3,998,683 | 12/1976 | Benton | 156/322 |
| 4,188,428 | 2/1980 | Wolf | 428/160 |

Primary Examiner—Caleb Weston
Attorney, Agent, or Firm—Herbert L. Lerner; Laurence A. Greenberg

[57] ABSTRACT

Method for the manufacture of molded bodies, which includes heating a plate of thermo-plastic hard polyurethane foam, placing a reinforcing cover layer of UP-Prepreg on at least one side of the plate, and forming the heated body under pressure to a given shape during the hardening of the polyester in the cover layer.

7 Claims, 1 Drawing Figure

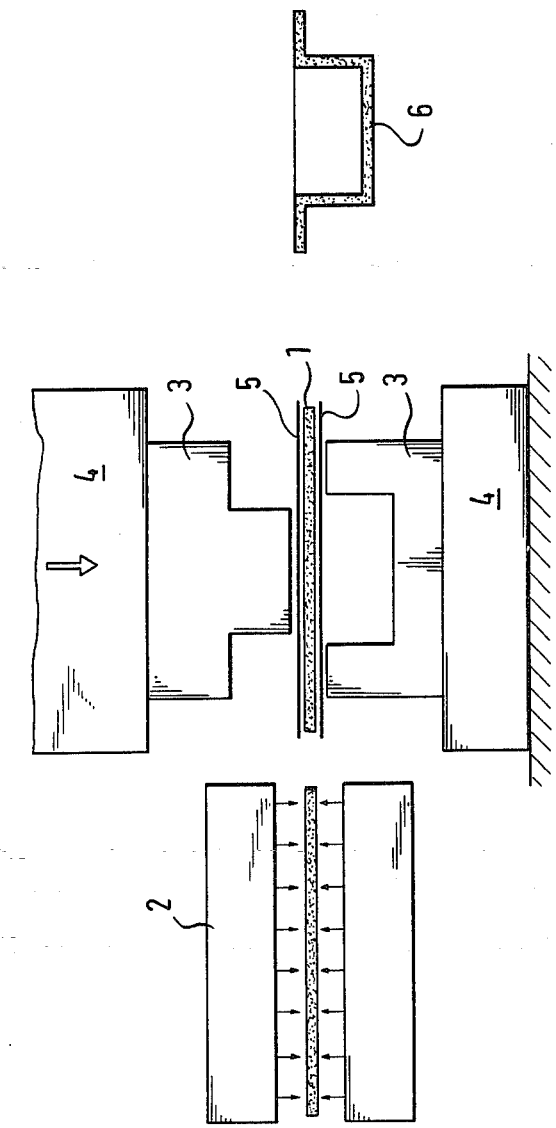

METHOD FOR THE MANUFACTURE OF MOLDED BODIES

The invention relates to a method for the manufacture of molded bodies having a foam material core, and a cover layer which serves as a reinforcement of the outer zone of the core.

Molded bodies of this type are extensively used in the automotive, housing, construction and furniture industries.

Various methods are being used for the manufacture of such molded products or bodies. For example, the hollow space between two preformed cover-layers can be filled with foam; as an alternate to this process the cover-layers can be prepared in the mold by a hand-lamination operation, and thereafter filled with foam; finally, the finished foam core can be coated with the cover layers at the end.

All these methods are used in practice, and each have certain advantages in the manufacture of special products. However, every one of these methods have the common disadvantage that the manufacturing costs are relatively high, because mass production of such formed products is not possible. This is due to the long setting or curing times of the formed bodies in the molds. Therefore, consideration must also be given to the fact that generally such formed products are submitted to very high stresses; for example, one can consider the use of a molded body as the seat in a motor vehicle. Such heavy duty usage requires very careful manufacturing methods, because minor manufacturing shortcomings, for example less than optimal bonding between the foam core and the cover layer, can already lead to problems after a short period of use.

It is accordingly an object of the invention to provide a method for the manufacture of molded bodies which overcomes the hereinafore mentioned disadvantages of the heretofore known methods of this general type, and with which molded bodies that are capable of very heavy duty usage can be produced with a low manufacturing cost.

With the foregoing an other objects in view there is provided, in accordance with the invention, a method for the manufacture of molded bodies, which comprises heating a plate of thermo-plastic hard polyurethane foam, placing a reinforcing cover layer of UP-Prepreg or smc (sheet molding compound) on at least one side of the plate, and forming the heated body under pressure to a given shape during the hardening of the polyester in the cover layer.

In accordance with another mode of the invention, there is provided a method wherein the UP-Prepreg of the cover layer has good flow properties and short hardening times at temperatures between 100° C. and 120° C., preferably approximately 110° C.

In accordance with a further mode of the invention, there is provided a method wherein the UP-Prepreg of the cover layer comprises 100 parts UP-resin having an acid number of 20–50 and preferably 25–40, 1–7 and preferably 2–4 parts MgO, 0.2–2 and preferably 0.2–1.5 parts of a peroxide for triggering the hardening of the polyester therein, and 0.2–2 and preferably 0.3–1 part of a polymerization inhibitor.

In accordance with an additional mode of the invention, there is provided a method wherein the UP-Prepreg of the cover layer includes a thickening accelerator for shortening the curing time, and a zinc stearate.

In accordance with an added mode of the invention, there is provided a method wherein the UP-Prepreg of the cover layer comprises 100 parts UP-resin sold under the trademark PALATAL V4336, which is a thixotropic unsaturated polyester resin, by the firm BASF 3 parts MgO, 1 part of peroxide P 1310 which is tertiary Butylperoxy 2-ethylhexanoate sold by Noury Chemical under the trademark TRIGONOX 21 or INTEROX TBPEH, 0.5 part of peroxide which is Bis (tertiary Butylcyclohexyl) peroxydicarbonate, sold by McKesson Chemical under the trademark PERCADOX 16 or INTEROX BCHPC, 0.5 parts of polyermization inhibitor which is tertiary Butyl-Pyrocatechol sold under the trademark TBK solution 10 VH, 1 part of thickening accelerator sold under the trademark V 4131, which is a phosphorus chloride, by the firm BASF and 2 parts zinc stearate.

In accordance with yet another mode of the invention, there is provided a method which includes placing a second reinforcing cover layer of UP-Prepreg on the opposite side of the plate from the first-mentioned side.

In accordance with a concomitant mode of the invention, there is provided a method wherein the step of forming under pressure includes forming the heated body with pre-heated tools of a press.

The advantages achieved through the use of the invention are based on the fact that at least two different semifinished components, i.e. the plate of hard thermoplastic polyurethane foam and the UP-Prepregs, are formed together in one operation under pressure and bonded to each other, whereby the manufacturing process is considerably simplified compared to conventional methods which require several working steps. Furthermore, the materials used are self-adhesive, so that no additional cement layer need be applied.

With this method, compound products having several layers can also be made. For example, it is possible to produce bodies with a supporting core of foam material and two supporting cover layers capable of heavy duty usage.

In this way, a very close bond is formed between the foam-core and the one, or more, cover layers, so that the load on the surface of the molded body is very uniformly distributed onto the supporting core. This is also the case if after forming, the foam core has a relatively uneven shape which is quite different from the shape of the plate in the beginning. An important factor with respect to the heavy duty capability is that the cover layer has a closed outer surface, so that no weak points exist, as would be the case with a porous foam surface, for example.

After the unsaturated polyester resin is hardened, a very strong cover layer is formed which, together with the supporting foam-core, is also capable of withstanding the most heavy duty applications.

To obtain an advantageous compromise between a short hardening time of the polyester resin on the one hand, and a temperature which does not yet affect the hard foam on the other hand, UP-Prepregs should be used which have good flow properties at temperatures between 100° and 120° C. and which also have short hardening times.

Other features which are considered as characteristic for the invention are set forth in the appended claims.

Although the invention is illustrated and described herein as embodied in method for the manufacture of molded bodies, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which the single FIGURE of the drawing is a three-part fragmentary diagrammatic elevational view of an apparatus for carrying out the method of the invention.

Referring now particularly to the FIGURE of the drawing, it is seen that a plate 1 made of hard polyurethane foam which forms the core of the molded body is pre-heated in a heating device 2 shown at the left hand side of the FIGURE, until it reaches its moldable temperature. The temperature at which the material is moldable is approximately 415° K. for polyethylene foams, and approximately 475° K. for TPI-foams.

A cycling furnace may be used, for example, for the heating device 2 or IR-radiators, UV-radiators or contact heating plates.

The plate 1 is covered by layers 5 of partially hardened, previously impregnated, unsaturated polyester, commonly known as UP-Prepregs or smc (sheet molding compounds). The UP-Prepregs 5 which form the cover layers remain at room temperature during the heating of plate 1.

Simultaneously, the forming tool in the center of the FIGURE of the drawing is heated, and brought to a temperature in the range of approximately 290°–415° K.; a temperature of approximately 375° K. for the forming tool has proved to be best for TPI-foams in conjunction with UP-Prepregs.

The tools are made of metallic materials, and have cutting edges so that sharp corners and edges can also be formed; furthermore, the surfaces of the tool which come in contact with the molded body, and its cover layer respectively, must be polished, because the polyester resin of the UP-Prepregs reproduces the surface of the tool on the finished molded body.

UP-Prepregs with the following specifications of commonly available material are used:
100 parts UP-resin V4336;
3 parts MgO;
1 part peroxide P 13 10;
0.5 parts of the peroxide Parkadox 16;
0.5 parts of a polymerization-inhibitor, for example TBK-solution VH;
1 part of a thickening accelerator, for example V 4131; and
2 parts zinc stearate for improving the flow properties.

After heating the plate 1 made of thermoplastic polyurethane hard foam and heating the tool, the plate 1 together with the UP-Prepregs 5 is placed between the halves 3 of the tool as shown in the center of the FIGURE of the drawing, and formed by means of the press 4.

UP-Prepregs made with the above given specification are already formed at temperatures which do not damage the polyurethane hard foam even over extended time periods. The temperature of the tool was established while considering this fact.

After a predetermined hardening time has passed, the tool is opened and the finished molded body is taken out, and cooled to room temperature. Thereafter the molded body 6 shown at the right-hand side of the FIGURE, can be further processed, if necessary.

If necessary, a molded body of this type can be pre-formed by means of an additional form die, to avoid excessive form changes and the associated excessive stresses caused by the tool halves 3 and the press 4, respectively.

There is claimed:

1. Method for the manufacture of molded bodies, which comprises heating a plate of thermo-plastic hard polyurethane foam, placing a reinforcing cover layer of UP-Prepreg or sheet molding compound on at least one side of the plate, and changing the form of the heated body under pressure to a different given shape during the hardening of the polyester in the cover layer.

2. Method according to claim 1, wherein the UP-Prepreg of the cover layer has good flow properties and short hardening times at temperatures between 100° C. and 120° C.

3. Method according to claim 1 or 2 wherein the UP-Prepreg of the cover layer comprises 100 parts UP-resin having an acid number of 20–50, 1–7 parts MgO, 0.2–2 parts of a peroxide for triggering the hardening of the polyester therein, and 0.2–2 parts of a polymerization inhibitor.

4. Method according to claim 1 or 2 wherein the UP-Prepreg of the cover layer includes a thickening accelerator for shortening the curing time, and a zinc stearate.

5. Method according to claim 1, wherein the UP-Prepreg of the cover layer comprises 100 parts UP-resin V4336, 3 parts MgO, 1 part of peroxide P 1310, 0.5 parts of peroxide PERKADOX 16, 0.5 parts of polymerization inhibitor TBK solution 10 VH, 1 part of thickening accelerator V4131, and 2 parts zinc stearate.

6. Method according to claim 1, which includes placing a second reinforcing cover layer of UP-Prepreg on the opposite side of the plate from the first-mentioned side.

7. Method according to claim 1 or 6, wherein the step of forming under pressure includes forming the heated body with pre-heated tools of a press.

* * * * *